United States Patent
Robert

(10) Patent No.: US 8,375,788 B2
(45) Date of Patent: Feb. 19, 2013

(54) GYROMETER IN SURFACE TECHNOLOGY, WITH OUT-OF-PLANE DETECTION BY STRAIN GAUGE

(75) Inventor: Philippe Robert, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 339 days.

(21) Appl. No.: 12/692,032

(22) Filed: Jan. 22, 2010

(65) Prior Publication Data
US 2010/0186506 A1 Jul. 29, 2010

(30) Foreign Application Priority Data
Jan. 23, 2009 (FR) ...................................... 09 50432

(51) Int. Cl.
*G01C 19/56* (2006.01)
*G01P 15/10* (2006.01)

(52) U.S. Cl. .................................. 73/504.12; 73/514.29

(58) Field of Classification Search ............... 73/504.12, 73/504.14, 504.04, 514.29, 514.32, 504.16, 73/504.02
See application file for complete search history.

(56) References Cited

U.S. PATENT DOCUMENTS

| | | | | |
|---|---|---|---|---|
| 5,889,208 A | * | 3/1999 | Nose | 73/504.16 |
| 6,251,698 B1 | | 6/2001 | Lefort et al. | |
| 6,311,556 B1 | | 11/2001 | Lefort et al. | |
| 6,321,598 B1 | * | 11/2001 | Iwaki et al. | 73/504.02 |
| 6,487,864 B1 | | 12/2002 | Platt et al. | |
| 6,584,864 B2 | * | 7/2003 | Greenwood | 73/862.59 |
| 7,389,690 B2 | | 6/2008 | Robert | |
| 2006/0032306 A1 | * | 2/2006 | Robert | 73/504.02 |
| 2007/0222011 A1 | * | 9/2007 | Robert et al. | 257/415 |
| 2008/0314148 A1 | * | 12/2008 | Robert | 73/514.33 |
| 2010/0186506 A1 | * | 7/2010 | Robert | 73/504.12 |
| 2010/0186510 A1 | * | 7/2010 | Robert | 73/514.29 |

FOREIGN PATENT DOCUMENTS

| | | |
|---|---|---|
| EP | 1 626 282 A1 | 2/2006 |
| EP | 1 840 582 A1 | 10/2007 |
| EP | 2 008 965 A2 | 12/2008 |
| FR | 2 763 694 | 11/1998 |
| FR | 2 874 257 | 2/2006 |

OTHER PUBLICATIONS

U.S. Appl. No. 12/974,540, filed Dec. 21, 2010, Robert et al.
Xinxin Li, et al., "A Microgyroscope With Piezoresistance for Both High-Performance Coriolis-Effect Detection and Seesaw-Like Vibration Control", Journal of Microelectromechanical Systems, vol. 15, No. 6, XP011151351, Dec. 1, 2006, pp. 1698-1707.
M. Aikele, et al., "Resonant accelerometer with self-test", Sensors and Actuators A 92, Elsevier, XP4274041A, 2001, pp. 161-167.

(Continued)

*Primary Examiner* — Helen C. Kwok
(74) *Attorney, Agent, or Firm* — Oblon, Spivak, McClelland, Maier & Neustadt, L.L.P.

(57) ABSTRACT

A device that detects a rotation around a first axis, the device including: a substrate; a first zone having a first thickness and including at least one mass, defining, idle, a plane, arranged at a distance from a second axis of rotation contained in the plane, the mass being able to be caused to vibrate in the plane, perpendicular to the first axis of rotation, and at least two connecting arms that connect the mass to the second axis of rotation; and a vibration inducing device that causes the mass to vibrate in the plane.

19 Claims, 8 Drawing Sheets

OTHER PUBLICATIONS

W. Geiger, et al., "Decoupled microgyros and the design principle DAVED", Sensors and Actuators A 95, Elsevier, 2002, pp. 239-249.

Mark A. Lemkin, et al., "A 3-Axis Force Balanced Accelerometer Using a Single Proof-Mass", (4B2.01), International Conference on Solid-State Sensors and Actuators, Jun. 16-19, 1997, pp. 1185-1188.

Kianoush Naeli, et al., "Cantilever Sensor with Stress-Concentrating Piezoresistor Design", IEEE, (School of Electrical and Computer Engineering Georgia Institute of Technology), 2005, pp. 592-595.

Kianoush Naeli, et al., "Coupling High Force Sensitivity and High Stiffness in Piezoresistive Cantilevers with Embedded Si-Nanowires", IEEE Sensors Conference, 2007, pp. 1065-1068.

E. Jesper Eklund, et al., "Single-mask fabrication of high-G piezoresistive accelerometers with extended temperature range", Journal of Micromechanics and Microengineering 17, 2007, pp. 730-736.

Navid Yazdi, et al., "Micromachined Inertial Sensors", Proceedings of the IEEE, vol. 86, No. 8, Aug. 1998, pp. 1640-1658.

Junseok Chae, et al., "A Monolithic Three-Axis Silicon Capacitive Accelerometer with Micro-G Resolution", Transducers, International Conference on Solid State Sensors, Actuators and Microsystems, (1D3.2), 2003, pp. 81-84.

Henrik Rödjegård[a], et al., "A monolithic three-axis SOI-accelerometer with uniform sensitivity", Sensors and Actuators A 123-124, Elsevier, 2005, pp. 50-53.

E. Jesper Eklund, et al., "Single-Mask SOI Fabrication Process for Linear and Angular Piezoresistive Accelerometers with On-Chip Reference Resistors", IEEE, (Department of Electrical Engineering and Computer Science Univ. of California), 2005, pp. 656-659.

* cited by examiner

GYROMETER IN SURFACE TECHNOLOGY, WITH OUT-OF-PLANE DETECTION BY STRAIN GAUGE

TECHNICAL FIELD AND BACKGROUND OF THE INVENTION

The invention concerns the field of micro-sensors, in particular in silicon, for example inertial sensor units, in particular gyrometers.

It is applicable in various fields, including the automobile, mobile telephony and avionics fields.

In a known manner, resonant sensors can be realized in volume technology, in which case the sensitive element of the sensor is made in the entire thicknesses of a silicon or quartz substrate, by using wet etching; such a technique is described in document FR 2 763 694.

Document EP-1 626 282 describes a gyrometer capable of detecting movement along a plane perpendicular to the plane of the device.

Such a device is not able to detect rotation around an axis situated in its own plane.

The invention therefore aims to propose a new type of gyrometer-type device, making it possible to perform a detection around an axis situated in its own plane.

BRIEF DESCRIPTION OF THE INVENTION

The invention proposes a new type of sensor, realized in planar technology, making it possible to detect an out-of-plane stress applied to a freed mechanical mass, and implementing detection via one or several suspended gauges, for example of the piezoresistive or resonator types (beam or tuning fork).

This sensor according to the invention makes it possible to realize a gyrometer. In particular, it allows differential detection.

It makes it possible to separately optimize the shapes, materials and thicknesses of the mobile portion (inertial mass) and of the gauge used to detect and measure the strain.

More precisely, the object of the invention is a gyrometer-type device, for detecting a rotation around a first axis (Z), this device being realized from a substrate or realized in a substrate or in the surface or the superficial zone of a substrate or comprised in a substrate, and including:

a) A first zone, called thick zone, having a first thickness and including:
  at least one mass, defining, when idle, a plane, arranged at a distance from a second axis of rotation contained in this plane, this mass being able to be caused to vibrate in this plane, perpendicular to the first axis of rotation,
  at least two connecting arms in order to connect said mass to said second axis of rotation, or to means at least partially aligned with the second axis of rotation,
b) means for causing said mass to vibrate in its plane,
c) a second zone, with a second thickness, forming, for at least one of the arms, at least one connection with the substrate for a rotation around said second axis of rotation, this second zone having a thickness less than or equal to that of the first zone; the connection formed with the substrate can be of the pivot or hinge type,
d) a third zone, called thin zone, with a smaller thickness than that of the second zone, forming at least one strain gauge of the suspended type, in order to detect the rotational movement around said second axis of rotation.

Preferably, this third zone:
  extends in a plane parallel to the plane of the substrate and not containing the axis of rotation,
  extends in a plane perpendicular to the second axis of rotation,
  is connected, on one hand, to one of the first and second zones and, on the other hand, to the substrate.

The second zone is thicker than the third zone such that the second axis of rotation is positioned above or below the point of application of the strain on the gauge.

The fact that the second zone has a smaller thickness than the first zone makes it possible to ensure a low stiffness which favors the rotation and brings the axis of rotation closer to the point of application of the strain, which makes it possible to favor a lever arm effect.

The third zone is preferably as thin as possible so as to ensure optimal sensitivity (the thinner this zone is, the most significant the strain for a given width).

The first and/or second zone(s) can be formed by semi-conductive and/or conductive and/or insulating materials. The first and second zones can be formed by identical or different materials.

The first zone can have a thickness strictly greater than that of the second zone, which itself has a thickness strictly larger than that of the third zone, including the strain gauge(s).

The thickness of the third zone can be less than or equal to half the thickness of the second zone.

Such a device makes it possible to detect a rotation imposed around the first axis, situated in the plane of the device itself. The detection done is that of a movement outside this plane, around the second axis of rotation. This movement around this second axis of rotation results from Coriolis forces, which themselves are caused by the combination of the initial rotation, imposed on the entire device, and the vibration of each mass in its own plane.

Such a device can be realized in the form of a surface-type MEMS sensor, formed in a substrate, advantageously in a semi-conductive material, for example in silicon. The device itself can therefore be made in a semiconductive material, here again in silicon or SiGe, for example.

In a first specific embodiment, the first zone comprises two masses, each at a distance away from the second axis of rotation.

These two masses can have a second axis of rotation which they share, and which is combined or common with the first axis of rotation. In particular, each of the two arms can connect each of the two masses to said second common axis of rotation.

In such a device, at least two gauges can be provided in order to detect the rotational movement, these two gauges being differential-mounted. This type of differential assembly can also be applied to other embodiments of the invention.

Alternatively, the two masses can have two axes of rotation (H, H') different from each other, parallel to each other and to the first axis of rotation, the first zone comprising at least four arms, including two arms to connect each mass to its second axis of rotation.

Such a device can also include means for coupling the two masses in anti-phase, depending on the excitation mode.

A device according to this variation can include at least one gauge for detecting the rotational movement of each mass.

For example, the strain gauge(s) is/are made in a piezoresistive material such as monocrystalline or polycrystalline silicon, or include(s) silicon nanowires or carbon nanotubes, or monocrystalline or polycrystalline SiGe.

Nanowires, in particular silicon nanowires, are structures with a shape elongated in one direction, having a length following that direction. The transverse dimensions, in a section perpendicular to this direction, are much smaller than this length. These transverse dimensions are typically less than 100 nm, preferably less than 50 nm or 40 nm and advantageously less than 20 nm. Nanowires oriented along a direction X can be obtained by etching a silicon beam along transverse directions Y and Z, or by growth of a nanowire, for example by catalyzed SLV deposition.

The strain gauge(s) can include a detection resonator, including at least one vibrating strip, an excitation means and a means for detecting the vibration.

The excitation of the vibrating strip and/or the detection of the resonance can be done using electrostatic means via at least one electrode arranged, in relation to the vibrating strip, in the direction of vibration.

The detection of the resonance can also be done via piezoresistive means arranged on the vibrating strip.

Regardless of the embodiment of the invention, the strain gauge(s) and the first zone can both be situated on the same side in relation to a common plane, lower plane of the first zone in relation to the substrate. The first zone can be situated between an upper plane (N1) and a lower plane (N2), the axis (Z, H, H') of rotation being in a plane parallel to these two planes.

Advantageously, the point(s) of application (P) of the strains produced on each of the gauges is in a plane which is parallel to the plane containing the axis (Z, H, H') of rotation and which is perpendicular to each of the upper (N1) and lower (N2) planes.

Such a device can comprise a single gauge by connecting arm, the point of application of the strains on this gauge being in a plane identical to the plane passing through the axis of rotation, or different from this plane.

Alternatively, such a device can include several gauges by connecting arm, the points of application of the strains on these gauges being in parallel planes, different from that containing the axis of rotation.

Another object of the invention is a method for manufacturing a device according to the invention, including the realization of a first zone, a second zone, and a third zone as defined above.

The assembly can be obtained by etching of a substrate in a semi-conductive material. Preferably, the substrate is of the SOI type, and the etching is done in the superficial layer of this substrate.

DETAILED DESCRIPTION OF THE INVENTION

Different embodiments are illustrated by FIGS. 1A to 3D in which the reference for a same element is shared by the different figures.

Figure 1A:
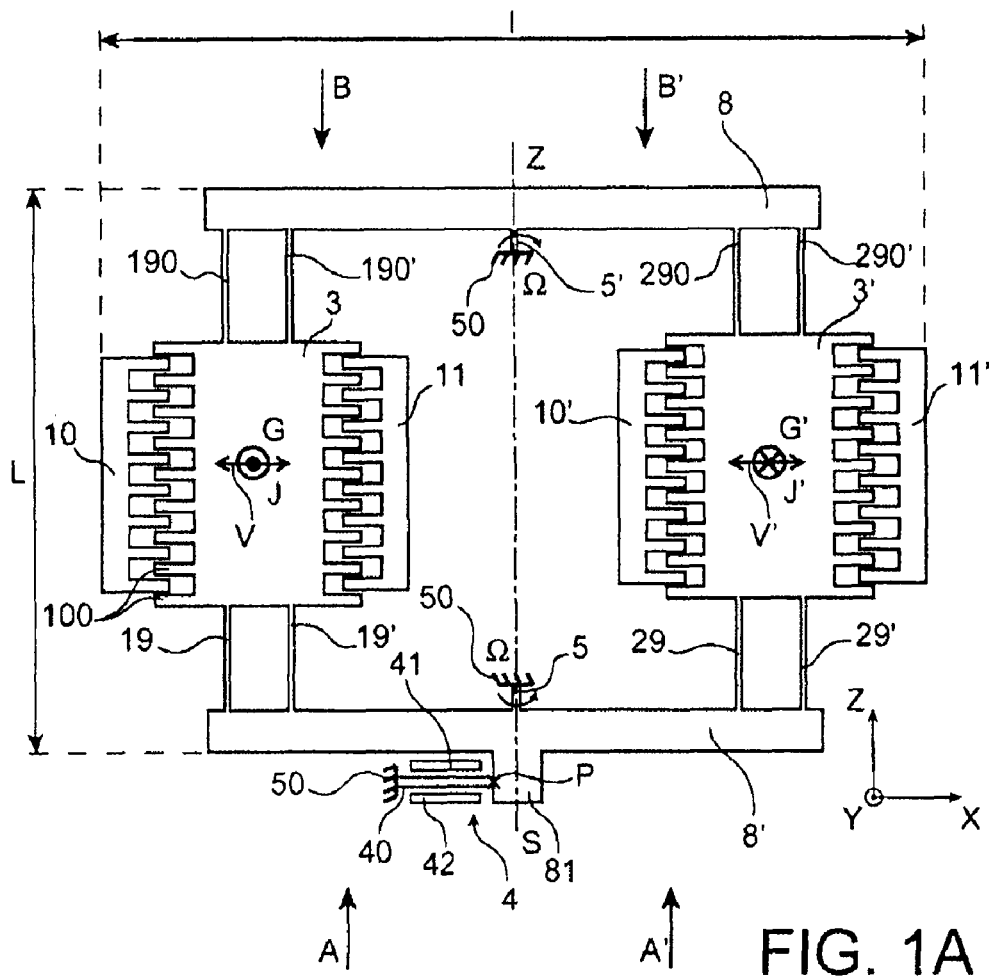
FIGS. 1A to 1F show, in front view and cross-section, a gyrometer-type sensor according to the invention, planar, with etched strain gauge.

A first embodiment of the invention concerns a gyrometer-type device illustrated in FIG. 1A (top view) and 1B-1F (cross-sectional views).

It involves a gyrometer-type sensor resonating with gauges positioned so as to measure a rotation. This sensor is planar (plane XZ) and undergoes planar excitation in its plane. If the device is subjected to rotation around an axis Z, arranged in its plane, Coriolis forces drive it in rotation around this axis, but the movement J corresponding to this rotation is situated outside the plane of the sensor.

FIG. 1A shows that this sensor comprises an assembly of two masses 3, 3' and an assembly of connecting arms 8, 8', 19, 19', 29, 29', 190, 190', 290, 290'. Idle, the arms and the masses are all situated in the plane of the device. Arms 8, 8' are connected to zones 5, 5' forming a pivot around an axis Z on which they are aligned. This axis is situated in the plane of two masses 3, 3'. It is the axis around which the movement J corresponding to a rotation outside the plane of the sensor will take place. The detection of this out-of-plane movement J of these masses is realized by a strain gauge 4. In fact, the pivot connections are connected on one hand to the arms 8, 8', and on the other hand to a fixed portion 50 of the device. This fixed portion 50 can be a substrate in which the device is realized.

Figure 1B:
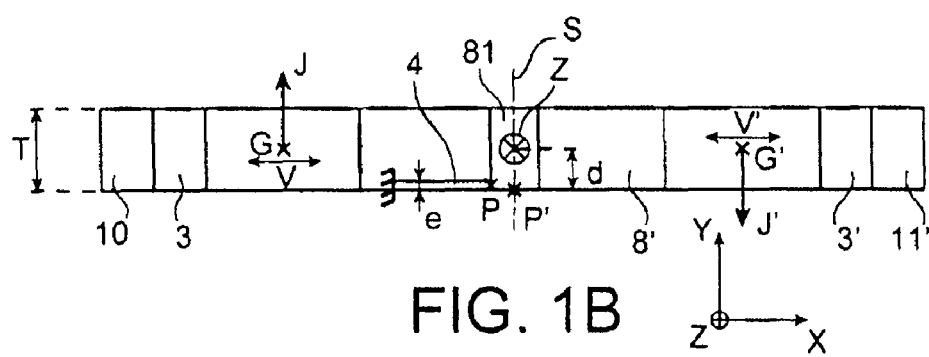

FIG. 1B (seen in cross-section of FIG. 1A, along arrows A, A' of FIG. 1A) shows that this sensor is planar and includes a first zone, of first thickness T, forming seismic mass, T being between some 100 nm and some 10 µm, for example 5 µm. In the plane in which the sensor extends, and which contains the axis Z, one defines the second axis X, perpendicular to Z. A third axis Y is chosen outside the plane of the sensor, perpendicular to the plane defined by X and Z.

The thickness T, like all of the thicknesses mentioned in this text, is measured perpendicular to the plane XZ of the sensor.

Moreover, the device has, in its plane XZ, an extension L, along the axis Z, which can be between several tens and several hundreds of µm, for example between 10 µm or 50 µm and 100 µm or 200 µm or 500 µm and a width l along the axis x, which can be between several tens and several hundreds of µm, for example between 10 µm or 50 µm and 100 µm or 200 µm or 500 µm.

This first zone includes the two masses 3 and 3' which are symmetrical to each other in relation to the axis z and a plane S perpendicular to the plane XZ of the sensor (the intersection between this plane S and the plane of the sensor corresponds to the axis of direction Z). This first zone also includes the assembly of connecting arms 8, 8', 19, 19', 29, 29', 190, 190', 290, 290'.

The second zone includes the zones or portions 5, 5' of the device forming pivot for the elements (masses and connecting arms) of the first zone. Each of the masses 3, 3' is connected, by the connecting arms, to these zones or portions forming pivot, which are oriented along the axis Z, for a rotation around that axis. In the example of FIG. 1A, the portions forming pivot are situated essentially midway on each of the arms 8, 8'.

The connection between seismic masses 3, 3' on one hand and the pivot zones 5, 5' on the other first includes two main connecting arms 8, 8'. Each of these arms is elongated along the direction X, so as to be essentially perpendicular to the axis Z. Each of these arms is arranged in the plane XZ of the masses when the latter parts are idle. One of the arms 8 is arranged, in the view of FIG. 1A, above both masses 3, 3', the other arm 8' below these same masses.

Secondary arms 19, 19', 190, 190', 29, 29', 290, 290', perpendicular to the arms 8, 8', connect the latter parts to the masses 3, 3'. Each of these arms is therefore elongated along the direction Z, so as to be essentially perpendicular to the axis X. These secondary arms are also in the plane of the masses when these masses are idle. Each arm has an elasticity or flexibility, in the direction X perpendicular to the pivot axis Z, granting it a spring function along that same direction X, therefore in the plane of FIG. 1A: each of these arms, after having been stressed along this direction X, returns to its idle position, illustrated in FIG. 1A, i.e. essentially parallel to the direction Z.

Idle, the assembly of the primary and second arms is in a same plane, the plane XZ of FIG. 1A. Two of the secondary arms 19, 19' connect the lower primary arm 8' to the mass 3, two other secondary arms 190, 190' connect the upper primary arm 8 to the same mass 3. The other four secondary arms 29, 29', 290, 290' serve the same function for the mass 3'. In other words, each of the masses is advantageously connected to the primary arms 8, 8' by four secondary arms, two secondary arms for each primary arm. In the illustrated embodiment there are four secondary arms for each mass. The number of secondary arms could be different: it could be greater than 4, but it could also be less than 4. For example, it is possible to have a single arm which connects the upper primary arm 8 to the mass 3, and a single arm which connects the lower primary arm 8' to the same mass 3, with an identical arrangement for the mass 3' and the primary arms 8, 8' (a single secondary arm between each primary arm and the mass 3').

The first zone, of thickness T, therefore includes the three portions that are the masses, the primary connecting arms and the secondary connecting arms. This assembly is situated in the plane of the substrate, as one understands according to FIG. 1B, in which only the primary arm 8', the detection means 4 and a portion of the masses 3, 3' and excitation combs 10, 11' (described below) are visible. Preferably, the masses, the primary arms and the secondary arms all have the same thickness T. This allows an out-of-plane movement (J, J') of the masses 3, 3' (in fact: a rotation Ω around the pivot axis Z) while avoiding flexing of the connecting arms 8, 8' (flexing perpendicular to the plane of FIG. 1A for the illustrated idle position) which would distort the measurement.

Such a device according to the invention also includes means for putting the masses 3, 3' in motion or vibration in the plane XZ.

According to the illustrated embodiment, these means include electrostatic means which will act in cooperation with the masses. The masses can be conductive. If they are, for example, in Si, the conductivity of this material is sufficient to ensure an electrostatic interaction with the combs. Preferably, the Si doping is then greater than $10^{15}$ at/cm$^3$.

Such electrostatic means for example include one or several capacitive combs 10, 10', 11, 11', connected to each of the masses. Each comb has teeth, each tooth extending along the direction X. One or several combs, or one or several rows of lateral teeth 100, are also realized on each mass 3, 3', each tooth 100 extending there also along the direction X in the idle position of the device. Each of these combs or rows extends parallel to the axis Z. Each row of teeth of each mass 3, 3' is connected to one of the capacitive combs 10, 11, 10', 11' such that a tooth of the capacitive comb is arranged between two neighboring teeth of each comb of the mass. FIG. 1A shows two combs for each mass; alternatively, a single comb per mass may suffice.

In the example of FIG. 1A, each of the two masses 3, 3' comprises two rows of lateral teeth 100, each arranged parallel to Z. On either side of each mass, in the plane XZ, are arranged two capacitive combs 10, 11 (mass 3), 10', 11' (mass 3'), which cooperate with this mass in order to grant it a vibrational movement along the direction X (movement indicated by "V", "V'" in FIG. 1A). The secondary arms, which make it possible to guide the movement, are then sufficiently fine along the axis X of vibration of the masses not to hinder this movement.

Advantageously, the vibrations of the two masses are in anti-phase, i.e. the masses are situated toward the outside of the sensor at the same time. In other words, the two masses are simultaneously at a same distance $d_{sup}$ from the axis Z, $d_{sup}$ being greater than the distance they have, in relation this axis, when they are idle.

Conversely, these two masses are inside the sensor at the same time. In other words, the two masses are simultaneously found at a distance $d_{inf}$ from the axis Z, $d_{inf}$ being smaller than the distance they have, in relation to this axis, when they are idle.

During operation, the masses 3, 3' are made to vibrate V, V' along the axis X, using the means described above. Upon a rotation Ω of the substrate 50 around the axis Z, to which the device is connected by each of the pivot axes 5, 5', Coriolis forces (such as F=Ω^V) appear, in order to bring each of the masses along the axis Y, perpendicular to the direction X of the vibrational movement applied to each of these masses and perpendicular to the direction of the axis of rotation Z.

When the vibrational movements of the two masses are in anti-phase, the two masses have movements in opposite directions along the axis Y.

Putting the masses 3, 3' into motion along the axis Y causes the secondary and primary arms to move, and in particular causes the latter parts to rotate around the pivot zones 5, 5'. It is this rotation which will be detectable by the means 4 forming the sensors.

Indeed, each part 5, 5' of the second zone, called pivot zone, is connected on one hand to the arms 8, 8', and on the other hand to a fixed part of the device 50. Each of these parts 5, 5' therefore undergoes torsion when the masses are put into motion along the axis Y, under the action of the Coriolis forces. In the case of acceleration along an axis perpendicular to the plane, each of the two masses 3 and 3' imposes a force of same direction on the connecting arms 8; there is then no torsion of the pivot zone 5, 5'. Having two symmetrical mass assemblies therefore makes it possible to differentiate between a rotation around the axis Z and an acceleration along the axis Y.

In the second zone, each pivot 5, 5' can have, for example, a thickness smaller than that of the first zone. Also preferably, there is a width (measured along the axis X) smaller than or equal to that of the secondary arms in order to facilitate the rotational movement around the pivot axis Z. These dimensions can be determined by simulation, in order to obtain sufficient sensitivity, but also to avoid the appearance of parasitic modes.

At least one of the primary arms, the arm 8' in FIG. 1A, has, in the extension of the pivot zone 5 to which it is connected, an extension 81. The thickness of this extension is greater than or equal to that of the gauge 40. This thickness can be the same as that of the arm 8 and that of the masses 3, 3'. This extension is arranged in the same plane as the masses and the arms, preferably it is arranged symmetrically to the pivot 5 in relation to the arm 8', in other words it is situated, in the plane of FIG. 1A, on the side of the arm 8' opposite the side connected to the pivot 5. It is oriented along the pivot axis Z, such that a rotation of the masses 3, 3' around the axis Z causes a rotation of the arm 8 and a rotation of the extension 81 around the axis Z. The pivot zones are in torsion, because they are connected on one hand to the arms 8, 8' and on the other to the substrate 50.

The position of the extension 81 can be not symmetrical to the pivot 5 fixed on the same arm. For example, one may have an arrangement like that of FIG. 1E, which shows the extension 81 offset in relation to the axis Z, but parallel thereto, such that at least one portion of this extension is tangent or nearly tangent to this axis Z. This makes it possible to position the point of contact of the gauge at the height of the axis Z as explained below.

At least one strain gauge 4 is positioned in contact with at least one of the extensions 81 such that the rotation of this portion imposes a force F on the strain gauge 4 in the plane XZ of the sensor. Alternatively, it is also possible to connect a gauge directly to the pivot which is in torsion—therefore to 5 or 5'.

The gauge(s) form(s) a third zone, with a third thickness, strictly smaller than the thickness of the pivot zones 5, 5'.

This preferably involves a suspended gauge. A "suspended" gauge is maintained in two portions called end portions. The portion of the gauge, called central portion, arranged between these two end portions has a non-null length and is not in contact with any other material, and in particular none of the materials making up the sensor.

In general, such a gauge has a shape which is elongated along one direction, and a length, called gauge length, which is very large in this direction (in comparison to each dimension measured in a section perpendicular to said direction). It is maintained in two end portions which each have a small or very small length compared to the length of the gauge or of its central portion.

Such a strain gauge is oriented here along the axis X, so as to be parallel to the plane of the sensor and perpendicular to the axis Z of the extension 81. The direction of the strain gauge(s) 4 is therefore normal to the plane S containing the axis Z.

As one sees in FIG. 1B, the point P of contact of a gauge on the mobile portion of the device is close to the pivot axis Z.

Figure 1C:
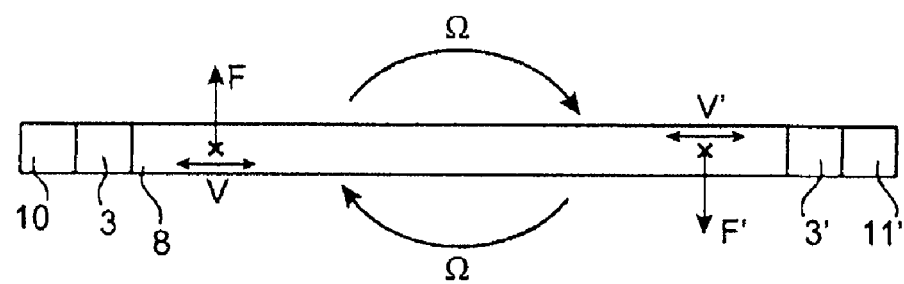
Figure 1D:
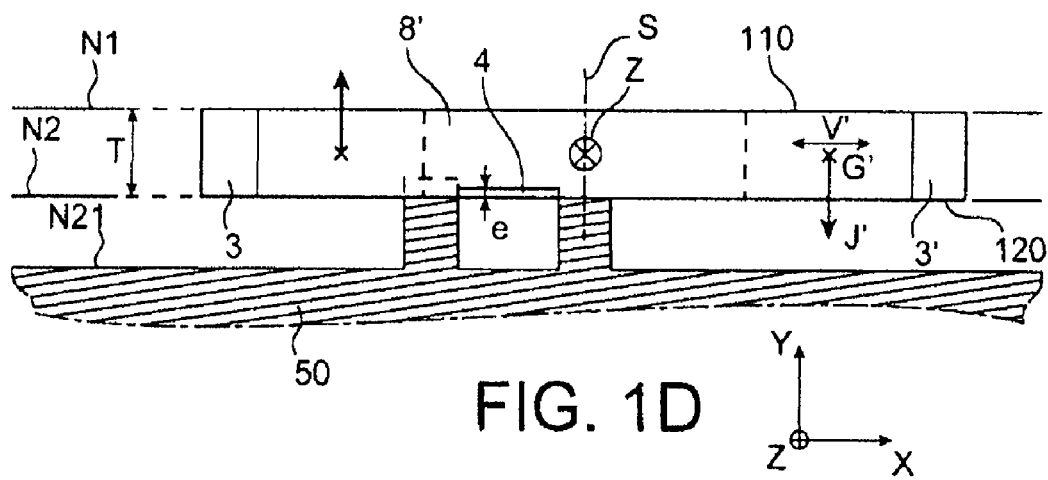
Figure 1E:
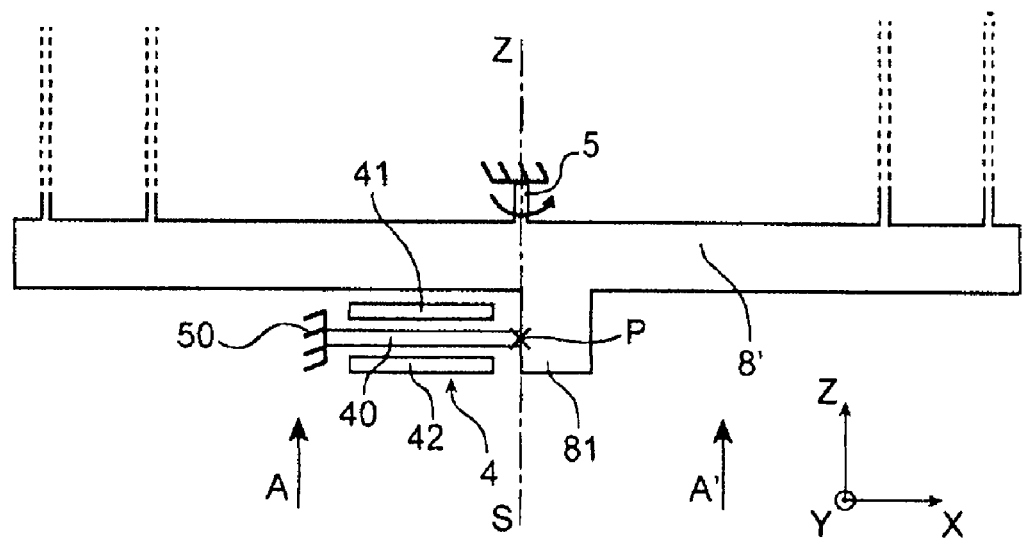
Figure 1F:
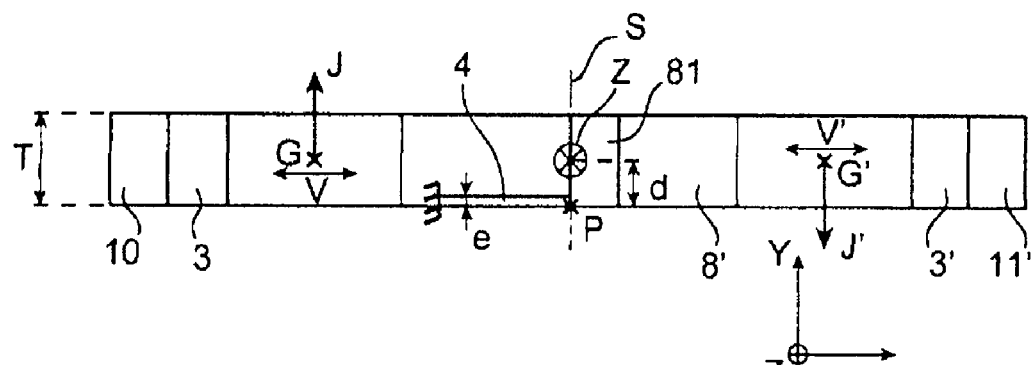

Preferably, as illustrated in FIGS. 1E and 1F, it is at the same level that this axis, i.e. in the plane S passing through this axis and perpendicular to the plane XZ in which the device is contained in the idle position (in fact: the plane of FIG. 1A). The point P is then said to be "directly below" the axis Z of rotation of the pivot connection 5, which makes it possible to have, at first order, only an axial strain on the gauge. This arrangement of the point of application of the strains on the gauge can in particular be obtained with an offset of the extension of 81 in relation to the axis Z, as already explained above. FIGS. 1E and 1F show only part of the device, the rest being identical or similar to the device of FIGS. 1A and 1B.

The lever arm effect between the center of gravity G, G' of a mass 3, 3', the axis of rotation Z and the point P of application of the strain on the strain gauge 4 is even more important when the point G, G' is far from the axis Z and the point P is close to this axis Z. However, if the point P is combined with the axis Z, there is no more lever arm effect.

A rotation Ω of the seismic mass around the axis Z translates to the application of a force F, along the axis X, exerted on the strain gauge 4 (see FIG. 1A).

Preferably the thickness e (along the direction Z, but preferably also along Y) of the gauge(s) is between some 10 nm and several micrometers, for example 1 μm or 2 μm or 10 μm. An example of thickness is 40 nm for a nanowire-type strain gauge or 200 nm for a suspended strain gauge in polycrystalline silicon or a detection resonator. Preferably, e is very small compared with d (e<<d, or e<d/10 or e<d/20), d being the distance between the axis Z and the lower plane N2 (as explained below and as illustrated in FIGS. 1A, 1B, 1E, 1F) of the device.

In the embodiment of the invention described by FIGS. 1A and 1B, 1E and 1F, the strain gauge 4 includes a resonator, which can vibrate in resonance in the plane XZ of the sensor.

This resonator includes a vibrating strip 40, an excitation means 41 and a measuring means 42. The means for producing the excitation of the vibrating strip can be an electrode forming a condenser with the vibrating strip 40 and connected to an alternating current generator, not shown in the figure. The resonator then vibrates in the plane XZ. The concerned electrodes are situated in relation to each other in a plane parallel to the plane of the substrate 2. The gap between the electrodes is, for example, in the vicinity of 50 nm to several μm, for example 1 μm or 5 μm. It can be formed using a photolithography with a controlled gap width, with precision of the order of the tens of nm or several tens of nm (for example: 10 nm or 50 nm) to the hundred of nm or several hundreds of nm (for example: 100 nm or 500 nm).

Whatever the means for exciting the strip, upon the application of a strain along the length of the strain gauge 4, perpendicular to the direction of vibration of the strip 40, the vibration frequency of the strip will vary. This variation is measured by the measuring means 42.

The measuring means can be of the piezoresistive type (one is then measuring a resistance variation), or be an electrode 42. In the latter case, the electrode makes it possible to measure the vibration frequency of the vibrating strip via the measurement of the variation of the capacity formed between the vibrating strip and the measuring electrode. The electrode 42 is then positioned, relative to the vibrating strip, in the direction of vibration of the vibrating strip.

In the embodiment of the invention described in FIG. 1A (or 1E), the excitation means 41 and the measuring means 42 are both capacitive.

In one embodiment of the invention where the strain gauges have detection resonators, as illustrated in FIGS. 1A and 1B, or 1E and 1F, the gauge is advantageously formed by etching, and arranged in a plane parallel to the general plane of the device, but passing under the torsion axis Z. Realization by deposition is also feasible, in which case the gauge is arranged in a plane parallel to the general plane of the device, but passing above the torsion axis Z.

Alternatively, as will be described below, the strain gauges can be of the piezoresistive type.

FIG. 1C illustrates diagrammatically, in a cross-sectional view, along the arrow BB' of FIG. 1A, the mechanical principle of this embodiment according to the invention. One sees only the arm 8, which hides the arm 8' and the other parts of the device, except one portion of the masses 3, 3' and combs 10, 11'. The pivots 5, 5' are also hidden. Also shown are the forces F, F' applied to the ends of the arm 8 and the rotation Ω. The forces F, F' are perpendicular to the plane of the device, the device therefore indeed undergoes mechanical disruptions outside its plane, disruptions which will be detected by the means forming the sensor.

FIG. 1D is, like FIG. 1B, a bottom view of FIG. 1A, along the arrows A, A' of FIG. 1A. But, also shown in this FIG. 1D is the substrate 50 to which the device according to the invention is connected, on one hand by the zones 5, 5' forming pivot, and on the other hand by an end of the gauge 4.

One indeed sees in this figure that the device includes an upper face 110 (or first face) and a lower face 120 (or second face). The upper face 110 is in a plane N1, the lower face 120 is in a plane N2. N1 and N2 are both parallel to a plane N21 defined by the surface of the substrate 50. One therefore sees that the plane N2 is between the upper plane N1 and the plane N21 of the plate. The adjectives "lower" and "upper" are chosen for convenience, but do not express a definitive relative position of one of the planes in relation to the other. One can also use the expressions "first face" and "second face" or "first plane" and "second plane", respectively. In the rest of this text, a "plane" of the device designates a middle plane, situated between the two lower N2 and upper N1 planes; this middle plane passes through each of the masses when they are in the idle position.

The masses 3, 3' as well as the primary and secondary arms are arranged between the planes N1 and N2.

The axis Z of rotation is also arranged between these two planes, parallel to each of them.

The portions constituting the second zone, which are in fact portions forming pivots 5, 5', are also arranged between these two planes. Advantageously, the axis Z and the centers of gravity G and G' of the two masses 3, 3' are arranged in a same plane, itself also parallel to the two planes N1 and N2. This arrangement is advantageous because it avoids a sensitivity to transverse accelerations.

Lastly, we see that the gauge 4 is arranged near the lower plane N2. Preferably, this gauge and the masses 3, 3' are arranged on a same side of the lower plane N2, in relation to the substrate 50.

In other words, in FIG. 1D, the gauge and the masses 3, 3' are arranged in contact with the plane N2, but above this plane. More particularly, the gauge and the masses each have a lower plane and an upper plane which are both arranged parallel to the plane of the substrate, but at different altitudes along the axis Y: for the masses 3, 3', these lower and upper planes are combined with the planes N1 and N2. In the embodiment illustrated in FIG. 1D, the plane N2 is also the lower plane of the gauge 4. N1 and N2 are themselves perpendicular to the plane of FIG. 1D, and the substrate 50 is arranged below the plane N2. Such an arrangement is compatible with a realization of the gauge, as moreover with other portions of the device, by etching. The same remarks apply if a plurality of gauges are used. Alternatively, the gauge can be deposited near the plane N1 which then constitutes the lower plane thereof.

A device according to the invention can be realized in a semi-conductive material, for example in monocrystalline or polycrystalline silicon or in a layer of SiGe, deposited on a substrate made of silicon or another glass-type material.

One understands according to FIG. 1D that a device according to the invention can be included or realized in a substrate or plate 50. It is then realized in the same material, for example of the semi-conductive type such as one of those indicated above, as the substrate or plate 50.

One technique used to realize a device according to the invention is then an etching technique of the substrate or the plate 50, with the appropriate masking steps. All of the parts of the device can then be realized by etching, including the third zone, that in which the gauge(s) 4 is/are defined. Alternatively, the gauges can be realized by deposition.

These remarks on the materials which can be chosen to realize a device according to the invention, the possibility of using the substrate 50 to realize this device and the realization techniques are valid regardless of the embodiment, whether it is that which was described above, or those which are described below in connection with the other figures.

A second embodiment of the invention will be described in connection with FIGS. 2A and 2B. It again concerns a sensor of the gyrometer type, of the same type as that of the previous embodiment, the differences being primarily related to the strain gauges.

In this embodiment, there are four strain gauges arranged differentially, two for each pivot zone or for each extension 81, 82 of each zone forming a pivot. The extension 82 and the pivot 5' have the same relative arrangement, in relation to the arm 8, as the pivot 5 and the extension 81 in relation to the arm 8'. In the example illustrated in FIG. 2A, the two gauges 6, 6' are directly applied to the extension zone 82 of the pivot 5' for the upper primary arm 8. Each of these two gauges is also fixed to the substrate 50. A movement of the arm 8 therefore imposes a force on each of the gauges 6, 6' in the plane of the sensor. These two gauges are arranged symmetrically to each other in relation to the plane S and in relation to the axis Z. Two gauges 4, 4' are applied to the extension 81 of the zone 5 forming pivot for the lower primary arm 8'. Each of these two gauges is also fixed to the substrate 50. The lower primary arm 8' imposes a force on each of the gauges 4, 4' in the plane of the sensor. These two gauges 4, 4' are arranged symmetrically to each other in relation to the plane S and in relation to the axis Z; the same is true for the two gauges 6, 6'.

Each gauge is for example of the type whereof the resistance varies according to the strain applied. Such a gauge is then advantageously made in a piezoresistive material, for example in monocrystalline or polycrystalline silicon, or it is made up of carbon nanotubes, or silicon nanowires, etc. . . .

Idle, the four gauges are arranged in the vicinity of the plane formed by the seismic masses 3, 3' and by the arms 8, 8'. Their exact arrangement may be that of FIG. 2C, the plane N2 constituting the lower plane of the gauges and of the masses 3, 3'. Alternatively, the gauges are arranged near the plane N1, which constitutes the lower portion thereof.

Figure 2A:
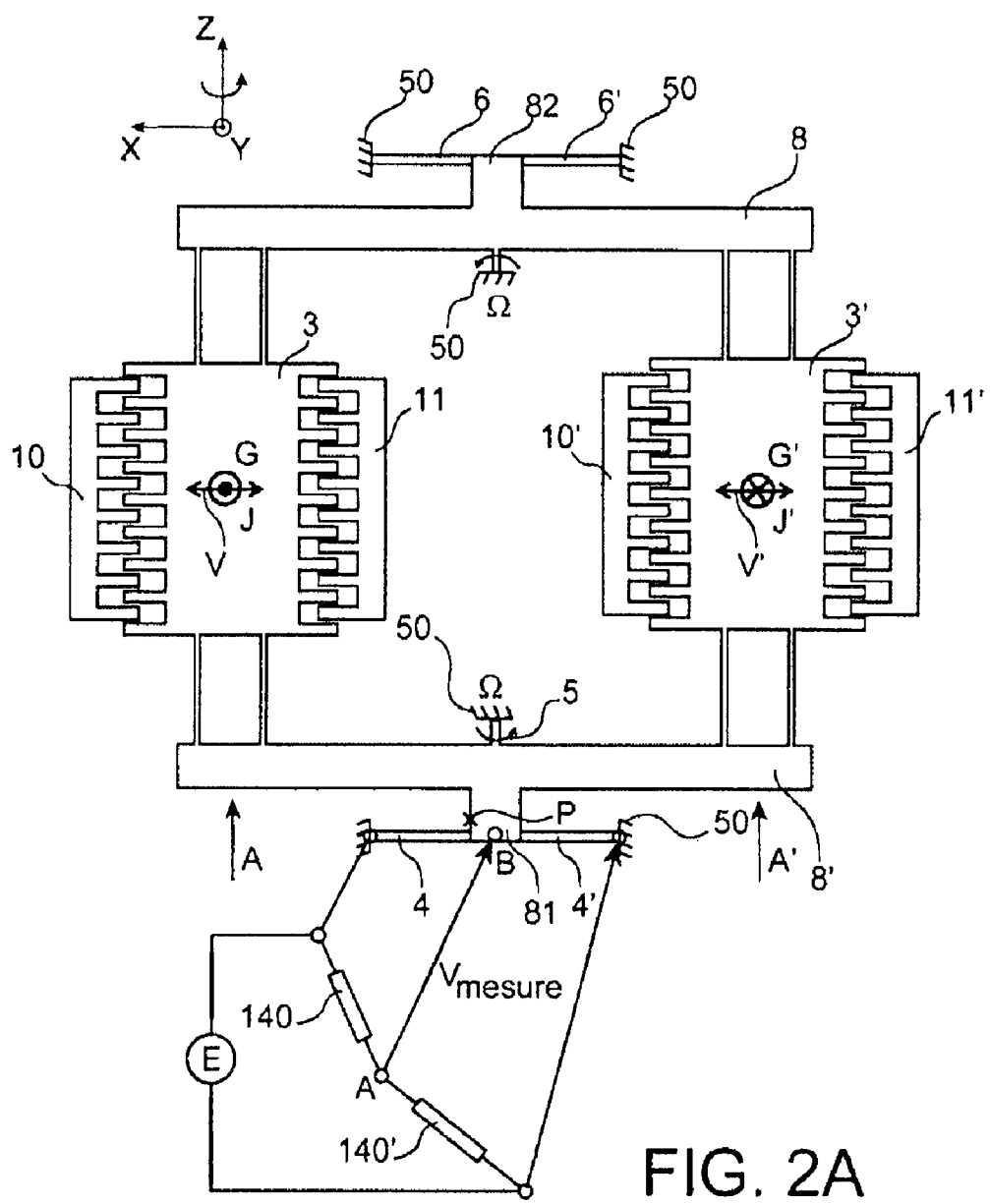
FIG. 2A illustrates a gyrometer according to the invention, of the planar type, with strain gauges differential mounted or mounted opposite each other.

In each pair of gauges, the strain gauges can be mounted symmetrically in relation to each other in relation to a plane, perpendicular to the substrate, passing through the torsion axis Z. But other arrangements are possible, as illustrated in FIG. 2D, which illustrates only the two gauges 4, 4', arranged on either side of the plane, perpendicular to the substrate, passing through the torsion axis Z, but non-symmetrically to each other in relation to this plane. This arrangement of FIG. 2D is also applicable to the gauges 6, 6'. A rotation $\Omega$ of the device and the Coriolis forces applied to the masses 3, 3' result in a traction force f on one of the two gauges of each pair of gauges 6, 6' and 4, 4' and compression on the other gauge of this same pair of gauges. The strain can therefore be measured differentially: i.e. the sensor will be mounted so as to measure the difference between the strain applied to one of the gauges of each pair and that applied to the other gauge of this same pair of gauges.

Thus, it is possible to free oneself from the variations of parasitic strains (for example due to temperature) which, identical for both gauges in each pair, cancel themselves out upon differential measurement; the two measuring points therefore make it possible to obtain better measuring precision. One can also say that the two gauges are differential mounted.

This differential assembly is possible, in particular with strain gauges of the detection resonator type, by adding, to the assembly, an electrical apparatus making it possible to subtract, between them, the two frequencies of the two resonators: the measured frequency variation is then proportional to the strain seen by the gauges.

In the case of strain gauges in material with variable resistance, the differential measurement may be done, for each pair of gauges, using a Wheatstone bridge.

Figure 2B:
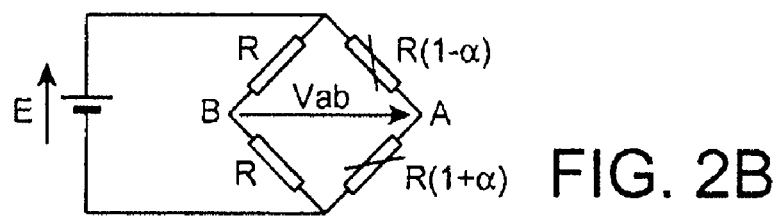
FIG. 2B illustrates a diagram of a Wheatstone bridge.

FIG. 2B shows the schematic diagram of a differential Wheatstone bridge whereof the 4 branches each have a resistance value R. A voltage measurement $V_{AB}$ between two points A and B opposite the bridge makes it possible to measure the difference $2\alpha R$ between the resistors arranged on either side of one of these two points, of values $R(1+\alpha)$ and $R(1-\alpha)$ and which vary inversely to each other.

The two gauges 4, 4' of FIG. 2A can each form an arm of a differential Wheatstone bridge. One assumes that each of these two gauges is associated with a resistance R of known value.

In order to form this differential Wheatstone bridge, a voltage measurement point B is chosen between the two gauges 4 and 4', here on the portion 81 of material of the first zone extending the pivot zone 5'. Due to the position of the two gauges 4, 4' (on either side of the extension 81), a torsion of the pivot zone 5' results in forces applied to these two gauges which are opposed.

The Wheatstone bridge is formed with two other resistors 140, 140', as illustrated in FIG. 2A. Another point A of measurement is positioned between these two resistors.

Thus formed, the bridge makes it possible to go back to a resistance variation $2\alpha R$ between the resistors, resistance variation which is imposed on the strain gauges 4, 4' by rotation of the extension 81 around the axis Z, caused by the torsion of the pivot zone 5. This method makes it possible to free oneself from other resistance variations of the strain gauges, due for example to an acceleration or to heat expansion. The current is supplied for example by one of the gauges 4, and the current exits via the second strain gauge 4'.

In the case of two pairs of gauges 4, 4', 6, 6', as illustrated in FIG. 2A, one obtains two resistance variation measures, each pair of gauges being able to be connected to a same Wheatstone bridge (called full bridge). Advantageously, only one pair of gauges can be used, for example the pair 4, 4' or the pair 6, 6'. Indeed, the multiplication of the gauges causes a corresponding division of the strain applied to each gauge.

In the first two embodiments of the invention, the presence of connecting arms 8 and 8' as well as of the extension(s) 81, 82 along the axis of rotation make it possible to distinguish between an acceleration along the axis Y and a rotation of the sensor around the axis Z. In both cases, a force along Y is imposed on the masses.

However, in the case of an acceleration along Y imposed on all of the device, the forces imposed on the two masses 3 and 3' are identical, of the same value and direction. There is then no torsion of the zone of second thickness and therefore no strain applied on the strain gauge. Indeed:
  either the arms 8 and 8' ensure, by their rigidity along the axis Y, an absence of movement along Y and therefore an absence of rotation of the masses,
  or the rigidity of the arms 8 and 8' is insufficient, but the forces imposed on the masses being identical, the rotational movement of the mass 3 is opposite that of the mass 3'; the strains contributed by these movements on the pivot zone therefore cancel themselves out and there is then no rotation transmitted to the pivot.

Figure 2C:
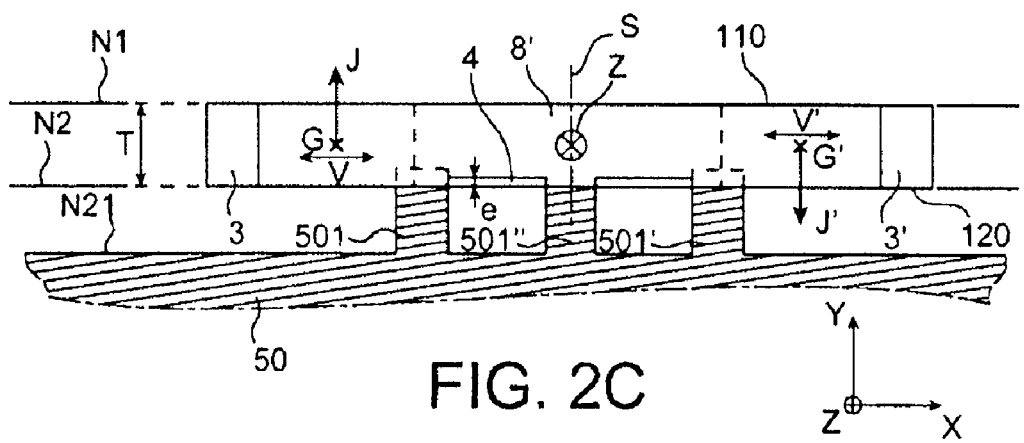
FIG. 2C illustrates a cross-sectional view of the device of FIG. 2A.
Figure 2D:
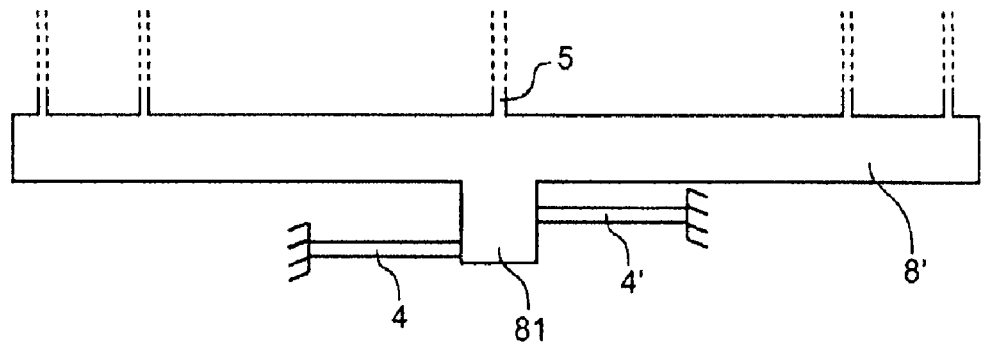
FIG. 2D illustrates part of a variation of the device of FIG. 2A.

FIG. 2C is a bottom view of FIG. 2A, along the arrows A, A' of FIG. 2A. But also shown in this FIG. 2C is the substrate 50 to which the device according to the invention is connected, on one hand by the zones 5, 5' forming pivot, and on the other hand by the ends of the gauges 4, 4'. In fact, the connection with the substrate is done with pins or blocks 501, 501', 501" which protrude in relation to the surface N21 of the substrate and obtained by etching thereof.

This figure clearly shows that the device here again includes an upper face 110 (or first face) and a lower face 120 (or second face). The upper face 110 is in a plane N1, the lower face 120 is in a plane N2. All of the comments made above in connection with FIG. 1D and relative to the relative positions of the different parts and of the axis Z of the device in relation to these two planes are applicable here.

But this FIG. 2C shows that the two gauges 4, 4' are both arranged near the plane N2. Preferably, these gauges and the masses 3, 3' are arranged on a same side of the lower plane N2, in relation to the substrate 50. Here again, such an arrangement is compatible with a realization of the gauges, like the other parts of the device moreover, by etching. The same comments apply to a pair of gauges 6, 6' arranged near the other arm 8'.

All of the comments above in connection to FIG. 1B and relative to the position of each of the points of application of the stresses on the gauge are applicable here. In particular, there is an interest in arranging the different points of application of the gauges applied to a same primary arm in different planes parallel to each other and to a plane which contains the axis Z of rotation and which is perpendicular to each of the first plane N1 and second plane N2 of the device (these two planes N1 and N2 are shown in FIG. 2C).

Figures 3A, 3B:
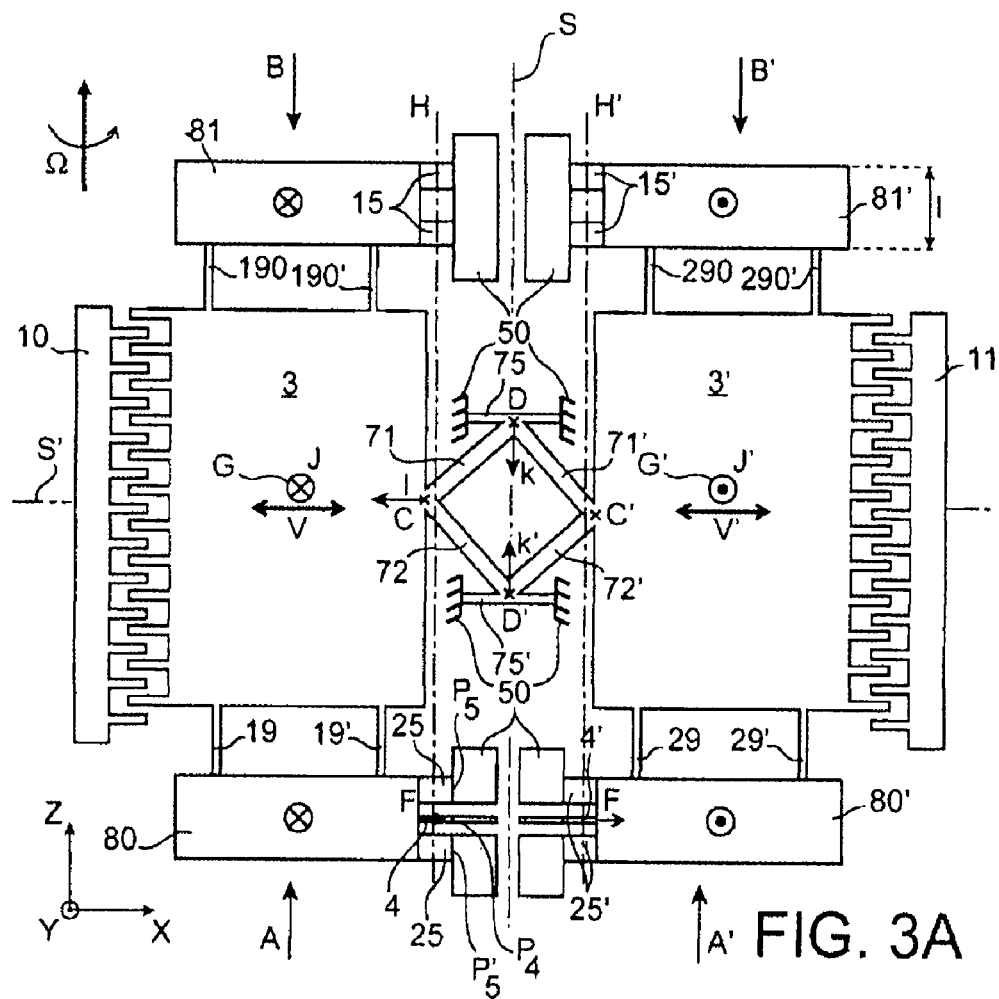
FIGS. 3A and 3B illustrate, in front and top view, another variation of a device according to the invention, with sensitive axis in the plane, and with high-excitation coupling.

A third embodiment of a device according to the invention is illustrated in front view in FIG. 3A.

This device, like the device described in the preceding embodiments of the invention, is made up of three zones. It has essentially the same dimensions as those indicated above, in thickness T, as well as in dimensions L and 1 in the plane XZ.

A first zone includes two masses 3 and 3', symmetrical to each other in relation to a plane S perpendicular to the plane of the substrate. The intersection between this plane and the plane of the substrate forms an axis of direction Z. The axis X and the axis Y are defined as in the first embodiment. The thickness T of this first zone is between some 100 nm and some 10 µm, for example 1 µm.

The first zone contains the two masses as well as the primary connecting arms 80, 80' and 81, 81' oriented along the axis X and secondary arms 19, 19', 190, 190', 29, 29', 290, 290' oriented along the axis Z.

Each of the primary arms 80, 80', 81, 81' is elongated along the direction X, so as to be essentially perpendicular to the axis Z. Each of these arms is arranged in the plane XZ of the masses when the latter parts are idle. Two of these arms are arranged, in the front view of FIG. 3A, above the two masses 3, 3' (one arm above each mass), the other two arms are arranged below these same masses (one arm below each mass).

The secondary arms 19, 19', 190, 190', 29, 29', 290, 290', perpendicular to the primary arms, connect the latter parts to the masses 3, 3'. Each of these secondary arms is therefore elongated along the direction Z, so as to be essentially perpendicular to the axis X. These secondary arms are also in the plane of the masses when the latter parts are idle. Each arm has an elasticity or a flexibility, in the direction X perpendicular to the pivot axis Z and in the plane of the sensor, granting it a spring function along this same direction X, in the plane of FIG. 3A: each of these arms, after having been stressed along this direction X, returns to its idle position, illustrated in FIG. 1A, i.e. essentially parallel to the direction Z.

Idle, the assembly of the primary and secondary arms is in a same plane, the plane XZ of FIG. 3A. Two of the secondary arms 19, 19' connect the first lower primary arm 8 to the mass 3, two other secondary arms 190, 190' connect the first upper primary arm 80 to this same mass 3. The other four secondary arms 29, 29', 290, 290' ensure the same function for the mass 3' and the primary arms 8' and 80'. In other words, each of the masses is connected to the primary arms by four secondary arms, two secondary arms for each primary arm. In the illustrated embodiment there are four secondary arms for each mass. The number of secondary arms could be different: it could be greater than 4, but it could also be less than 4.

The first zone of the device, of a first thickness T, includes the three parts which are the masses, the primary connecting arms and the secondary connecting arms. This assembly is situated in the plane XZ of the substrate. Preferably, the masses, the primary arms and the secondary arms all have the same thickness T. This makes it possible for an out-of-plane movement (J, J') of the masses $3, 3'$ to result in a rotation Ω of each mass around its axis of rotation and to avoid flexing of the primary connecting arms $8, 8'$, which would distort the measurement.

This device also comprises means for causing the masses $3, 3'$ to vibrate along the axis X. For the description of this means, see the description above of the first embodiment. Here this means can include a row of teeth parallel to the direction Z, on one side of each mass $3, 3'$, in fact the outermost side in relation to the axis Z, forming a comb. Opposite each of these combs is another comb $10, 11$. The fingers of these combs are interdigital with the teeth formed on the edges of the masses $3, 3'$.

A second zone, having a second thickness, smaller than or equal to the thickness of the first zone, is connected on one hand to the zone of first thickness and on the other to the substrate, globally designated by reference 50. This zone forms hinges $15, 15', 25, 25'$ of the primary arms $80, 80', 81, 81'$ to which the masses $3, 3'$ are connected. Each mass can be made to rotate around an axis of rotation defined by the hinges which connect the primary arms to which this mass is connected. Because of this, the axis of rotation of each mass $3, 3'$ are not combined with, or identical to, the axis Z, unlike the first and second embodiments already described. The two axes of rotation of the masses $3, 3'$ are designated by H and H', respectively. These axes are parallel to the axis Z. They are contained in the plane of the layers or of the mobile masses.

The hinges 15 and 25, connected to the seismic mass 3 via connecting arms 80 and 81, are aligned: the axis of rotation allowed by the hinge 15 is identical to that of the hinge 25, it involves the axis of rotation H parallel to Z for the seismic mass 3. The hinges 15' and 25' are also aligned, similarly, and form an axis of rotation H' parallel to Z for the seismic mass 3'.

The hinges or zones of second thickness are such that they do not allow the primary connecting arms $80, 80', 81, 81'$ any movement other than rotation around the axis H, H'. In the embodiment described, each hinge zone is made up of two portions, each connected on one hand to a connecting arm and on the other to the substrate 50, blocking the movements along X and Z, and only allowing rotations around H or H'. The advantage of this embodiment in two parallel portions is that it is possible to realize and position the gauge 4 connected between the two portions $25, 25', 15, 15'$. Moreover, it is thus possible, as illustrated in FIG. 3A, to electrically isolate the anchor point $P_4$ from the gauge 4 in relation to the anchor points $P_5 P'_5$ of the hinges on the zone 50 (in fact, the hinges have anchor zones on the zone 50 which are not reduced to a point, but the expression "anchor point" is used here in shortened form). This isolation can be obtained through suitable etching during realization of the device. What is described there for a single gauge and one hinge zone can be applied to all hinge zones and all gauges of the device.

Figure 3C:
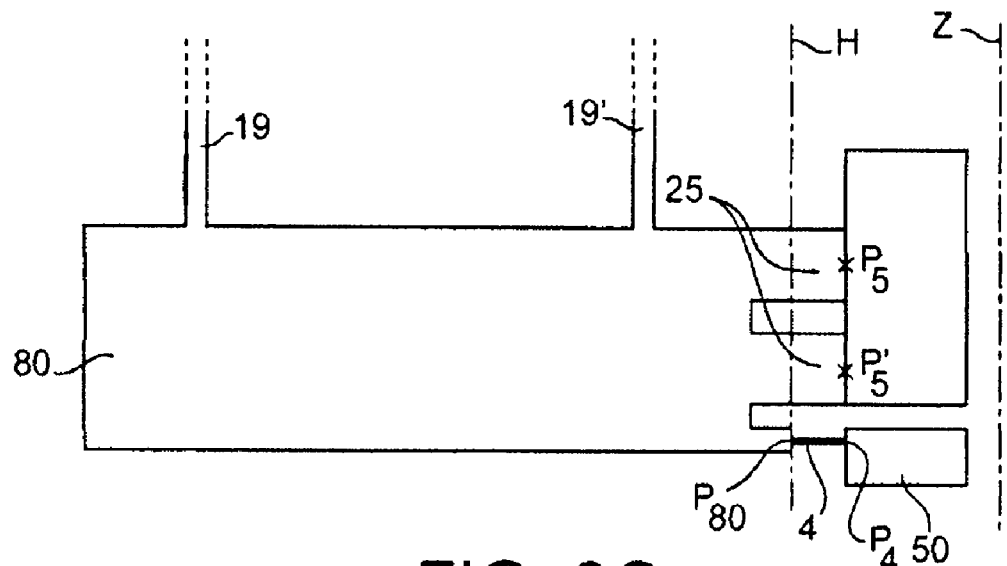
FIGS. 3C and 3D illustrate variations of part of the device of FIGS. 3A and 3B, FIGS. 4A-4G illustrate a method for realizing a device according to the invention.

FIG. 3C shows another embodiment, in which the gauge 4 is laterally offset in relation to the assembly of the two hinges 25: the gauge is therefore no longer comprised between the two hinges. Here again, one obtains electrical isolation of the anchor point $P_4$ from the gauge 4 in the substrate 50, in relation to the anchor points $P_5 P'_5$ of the hinges, for example by suitably etching the zone 50. Here again, this can be applied to all of the gauges and hinge zones.

Figure 3D:
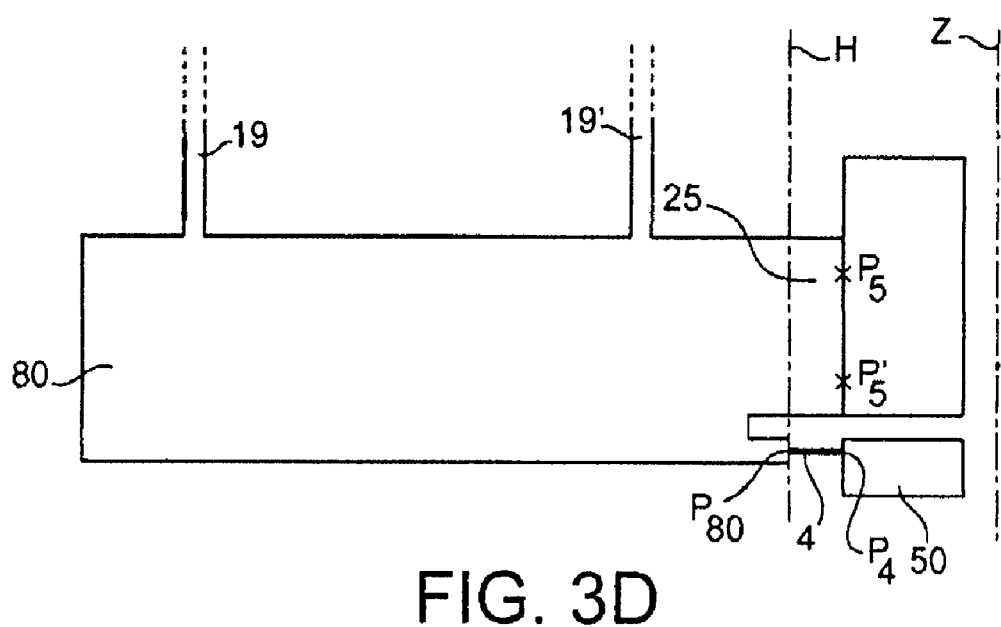

Alternatively, it is possible to limit the movements of the primary connecting arms along X and Z by forming wide pivot zones along Z, thereby preventing all movement of the connecting arms along Z: for example, one replaces the two hinges 15, 15' which connect the arms 81' to the fixed zone 50 by a single hinge, with a length along the axis Z essentially equal to the width $l_{81'}$ of the arm 81' measured in projection on the axis Z. They can have a slightly smaller length, to account for the positioning of a gauge, as illustrated in FIG. 3D (which shows the case of the arm 80). In this case, the positioning of the gauge 4 in relation to the single hinge can be obtained by offsetting the gauge laterally. Here again, one obtains electrical isolation of the anchor point $P_4$ of the gauge 4 in the substrate 50, in relation to the anchor point $P_5$ of the hinge, for example by suitable etching of the zone 50. Here again, all of this can be applied to all of the gauges and hinge zones.

More generally, in this embodiment, the anchor points of the gauges on the fixed portion 50 are electrically isolated from the anchor points or zones of the hinges on this same fixed portion. This can be obtained:

either by centered positioning of the anchor of each gauge on the fixed portion, isolated from the anchor of the hinges, as is the case in FIG. 3A;

or by off-centered positioning of the anchor of each gauge on the fixed portion, also electrically isolated from the hinges, as is the case in FIGS. 3C and 3D.

Preferably, the support point of a primary arm (for example the arm 80) on the corresponding gauge is arranged in a plane perpendicular to the planes N1 and N2 (i.e. a plane perpendicular to each of FIGS. 3A, 3B, 3C), parallel to the plane S which contains the axis Z, and containing the axis H or H'. In the embodiments of FIGS. 3C and 3D, this is obtained by suitable etching of the end of the arm 80 which is turned toward the zone 50, which makes it possible to position the support point $P_{80}$ of the arm 80 on the gauge 4 approximately above, or just above the axis H.

In this embodiment, the axes H and H' are "inside" the sensor, i.e. these axes are arranged between two axes parallel to Z passing through the centers of gravity G and G'. Advantageously, when the seismic masses are not in vibration, the axes H and H' pass through the points C and C' of the coupling structure 70, which will be described later.

A zone having a third thickness, strictly smaller than the thickness of the second zone, forms one or several strain gauges 4, 4' oriented along the axis X and fixed on one hand to the fixed substrate 50 and on the other hand to the first zone, in fact here to two primary arms (the arms 80 and 80').

The types of gauge which can be used are those already described above. A measurement by Wheatstone bridge may potentially be implemented, as described above in connection with FIGS. 2A and 2B. But there are preferably at least two strain gauges 4, 4', arranged symmetrically in relation to the plane S; at least one strain gauge is allocated to measuring the strain of each seismic mass. Indeed, the axes of rotation H, H' not being combined and the hinge zones allowing the rotation of the two masses being different for each of the two masses, the movements of each of the two masses are preferably measured separately, despite a coupling mechanism of the two masses which will be described later.

In this embodiment, the strain gauges are preferably of variable resistance and advantageously piezoresistive so as to facilitate differential mounting. In all cases a differential assembly has the advantages already explained above. Other examples of detection modes were provided in relation to the first embodiment.

Advantageously, the vibrations of the two masses 3, 3' are in anti-phase, i.e. the two masses are both located toward the outside of the sensor at the same time. In other words, the two masses are simultaneously at a distance from the axis Z greater than the distance they have, in relation to this axis, when they are idle.

Conversely these two masses are inside the sensor at the same time. In other words, the two masses are simultaneously found at a distance from the axis Z smaller than the distance which they have, in relation to this axis, when they are idle.

Means for producing this anti-phase vibration include a structure 70 for coupling the two seismic masses 3 and 3'. This structure makes it possible for a movement along the axis X of a first of the two masses 3 or 3' to result in a symmetrical movement, in relation to the plane S, of the second of the two seismic masses 3 or 3'. Such a structure 70 is described in the framework of the embodiment of FIG. 3A and following, but can be applied to the embodiments which were previously described (FIGS. 1A-2D), inasmuch as there is no electrostatic comb 10', 11 inside the structure.

This coupling structure 70 is symmetrical in relation to the plane S of symmetry of the sensor.

This structure 70 is furthermore symmetrical in relation to the plane S', perpendicular to the plane of the sensor, containing the direction X of the orthonormal reference XYZ and passing through the centers of gravity of the two seismic masses 3 and 3'. It includes, among others, two anchor arms 75 and 75', symmetrical in relation to the plane S', oriented along X, and having a certain flexibility along the axis Z. These anchor structures 75 and 75' have their respective centers D and D' in the plane S and are connected to the substrate 50, for example by connections embedded in the substrate 50.

Symmetrically in relation to the planes S and S', four transmission arms 71, 72, 71', 72', flexible along the axis X and the axis Z, oriented slanted in relation to the axes X and Z (for example at 45° in relation to these axes), connect the points C and C', intersection of the inner edge of the masses, opposite that supporting the lateral comb of the masses 3 and 3' with the plane S*, at the points D and D' of the anchor arms. These four transmission arms form a diamond or a lozenge. Advantageously, the distance between the points D and D' is identical to the distance between the points C and C', the transmission arms thus forming a square.

The coupling structure is designed such that a movement of the mass 3 imposes a force I on the coupling structure at the point C, imposing a movement along the axis X at the point C of the arms 71 and 72. Such an action, in comparison with the orientation of the transmission arms 71 and 72 and their flexibility along X and Z, imposes forces K and K' along the axis Z on the respective anchor arms 75 and 75'. These anchor arms being flexible along the axis Z, the forces K and K' will impose flexing on the centers D and D' of the anchor arms, bringing them closer together or further apart depending on the direction of the forces K and K' (and therefore according to the initial direction of movement of the masses 3, 3'). In the example used to illustrate the operation, the anchor arms come closer together.

The movement of the anchor arms 71', 72' will be symmetrical to that of the arms 71, 72 in relation to the plane S. Thus, by transmitting a movement along the axis Z to the points D and D', this movement imposes a movement on the transmission arms 71' and 72'. Given the orientation of the latter parts and their flexibility along X and Z, they will impose a force I' and a movement along the axis X, opposing the force I and the movement along the axis X imposed at the point C by the movement of the mass 3, on the mass 3', at the point C'.

The operation of the coupling structure 70, illustrated in the case of a movement distancing the mass 3 from the plane S, follows the same logic if the movement brings the mass 3 closer to the plane S or if the original movement is applied to the mass 3'.

Preferably, the seismic masses are caused to vibrate along the axis X symmetrically using means provided to this end, the capacitive combs 10 and 11 in the given example. The structure 70 ensures synchronization between the vibrations of the two masses. The thickness of the coupling structure can be smaller than that of the first and second zones, but is not necessarily smaller. This thickness results from a compromise between length, width and thickness, all while taking parasitic resonance modes into account.

During operation, the masses 3, 3' are caused to vibrate V, V' along the axis X, using the means described above. During a rotation Ω of a substrate 50 to which the device is connected by each of the hinges, Coriolis forces (such as F=Ω^V) appear, to bring each of the masses along the axis Y, perpendicular to the direction X of the vibrational movement applied to each of these masses and perpendicular to the direction of the axis of rotation Z.

When the vibrational movements of the two masses are in anti-phase, the two masses have movements in opposite directions along the axis Y.

Causing the masses 3, 3' to move along the Y axis causes the secondary and primary arms to move, and in particular causes the latter parts to rotate around hinges 5, 5', 15, 15'. It is this rotation which will be detectable by the means 4, 4' forming sensors.

FIG. 3B is a bottom view of FIG. 3A, along the arrows A, A' of FIG. 3A. But also shown in this FIG. 3B is the substrate 50 to which the device according to the invention is connected, on one hand by the zones 25, 25' forming hinges, and on the other hand by the ends of the gauges 4, 4'.

It can indeed be seen in this figure that the device includes an upper face 110 (or first face) and a lower face 120 (or second face). The upper face 110 is in a plane N1, the lower face 120 is in a plane N2. All of the comments made above in connection with FIG. 1D and relative to the relative positions of the different parts of the device and of the axes in relation to these two planes are applicable here. In particular, both axes H and H' are arranged, like the axis Z, parallel to the two planes N1 and N2, and between them.

Also shown in this figure are two pins or blocks 500, 500' of the substrate 50, which protrude in relation to the surface N21 of the substrate and which may have been defined by etching of the original substrate. Connected to these pins or blocks will be, on one hand, the hinges 25, 25' and on the other hand, the two gauges 4, 4'. This figure also shows the outline of the two axes H and H' around which the arms 80, 80' will be able to be actuated in rotation. Also visible in this figure is the arm 75' which connects the two arms 72, 72' to the substrate 50 (see structure of FIG. 3A). This arm 75' can be fixed to two pins or blocks similar to the pins or blocks 500, 500', but which may not be visible in FIG. 3B.

As in FIG. 2C, one sees that the two gauges 4, 4' are both arranged near the plane N2. Preferably, these gauges and the masses 3, 3' are arranged on a same side of the lower plane N2, in relation to the substrate 50. Here again, such an arrangement is compatible with a realization of the gauges, like other parts of the device moreover, by etching. The same comments apply to a pair of gauges 6, 6' arranged near the other arm 8'.

The gauges are electrically isolated from the hinges at the anchor point; these are arranged:

either in a centered zone of the anchor and isolated from the hinges (for example by etching);

or in an off-centered zone of the anchor and isolated from the hinges (for example by etching);

A view similar to that of FIG. 3B can be obtained from above the device, along arrows B, B' of FIG. 3A.

Regardless of the embodiment of the invention, a voltage supply makes it possible to power the combs to grant each of the masses a movement in its own plane.

Moreover, the sensor(s) used is/are connected to processing means, for example a micro-computer, which will make it possible to process the data, and to provide information on the rotational movement undergone by the device around the axis Z.

A first method for realizing a device according to the invention will be described in relation to FIGS. 4A-4G. It corresponds to the case of an etched gauge. The gauge here is of the resonator type.

This method implements an epitaxy of semi-conductive material (here Silicon but this method can also be applied to SiGe).

Figure 4A:
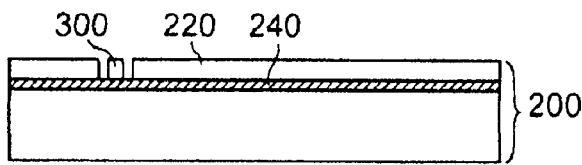

A SOI substrate 200 is first selected (FIG. 4A). For example, it includes a layer 220 of Si 0.5 μm thick for a layer 240 of $SiO_2$ oxide 1 μm thick.

Lithography, then etching of the layer 220 of Si are done in order to define a portion 300 of the detection resonator (FIG. 4A). This portion is therefore defined in the superficial semi-conductive layer, of small thickness. Alternatively, this step defines a portion of the piezoresistive gauge.

Figure 4B:
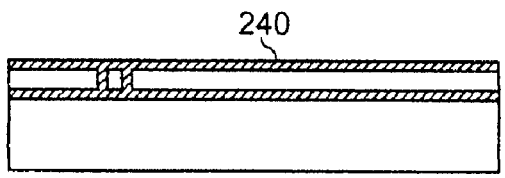
Figure 4C:
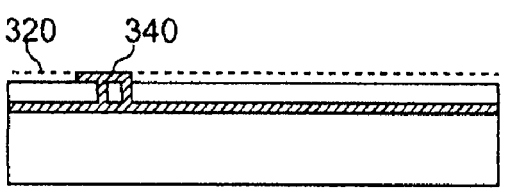
Figure 4D:
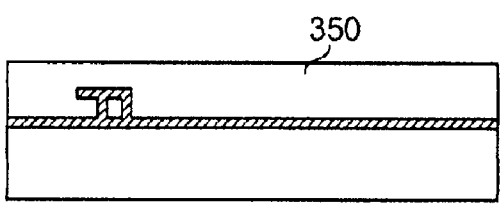
Figure 4E:
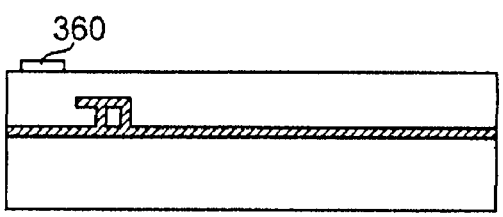
Figure 4F:
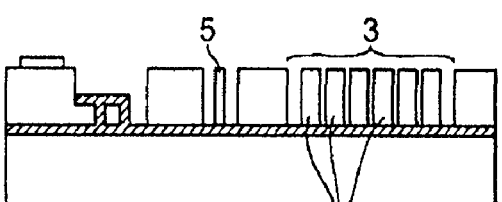
Figure 4G:
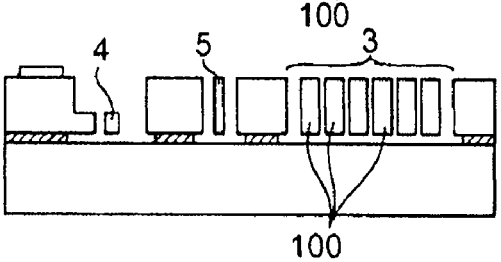

The etching is stopped on the layer 240 of $SiO_2$. One then proceeds with the deposition of a layer (not shown) of $SiO_2$, for example 0.5 μm thick, followed by planarization with stopping on the layer 220 of Si, then deposition 320 of $SiO_2$, for example approximately 0.4 μm thick (FIG. 4B).

One then proceeds (FIG. 4C) with lithography by etching, in the layer 320 of $SiO_2$, of protection 340 above the resonator, overhanging over at least part of the electrodes.

Silicon epitaxy 350 is then done (FIG. 4D) on the initial superficial semiconductor layer 220. The thickness of the epitaxied layer may be greater than the thickness of the layer 320, for example approximately 4 μm.

A Ti/Ni/Au metallic deposition, then lithography by etching are then done (FIG. 4E) in order to form contacts 360.

Lithography and anisotropic etching (for example: DREE) of the mechanical structure are then done (FIG. 4F), stopping on the layer of $SiO_2$ dioxide 240. This step makes it possible to realize, during the same operation, the mass(es) 3, 3' and the zones forming pivot or hinge 5, 5', 15, 15', 25, 25', 35, 35', 52, 52', the primary and secondary arms on a same thickness of material. One also recognizes the teeth 100 of the mobile mass 3.

The device is lastly released by HF etching (wet or steam) of the layer 240 (FIG. 4G), stopping at time. In FIG. 6G, one also clearly sees the gauge 4, situated at the bottom of the device.

Any geometry of a device according to the invention may be obtained by adapting the method which has just been described. In general, one will proceed with:

etching of the superficial layer of a SOI, to realize at least part of the detection means there; the etching is then stopped on the embedded isolating layer of the SOI;

formation of an epitaxied layer of Si on the etched superficial layer, possibly with prior formation of protection for the detection means;

possibly formation of contacts on this epitaxied layer, then etching of the mechanical structure (mobile masses, axes, arms . . . ; etc);

releasing of the assembly by etching of the embedded oxide layer.

This method can be adapted to the case of a piezoresistive gauge by removing the steps for the formation of excitation and detection electrodes. It can also be adapted to a gauge obtained by deposition.

A device of the invention can comprise means for limiting parasitic movements of the masses. This means can include in particular spring elements blocking the movements outside the axis of rotation.

According to another aspect, a device according to the invention (except that of FIG. 3) includes a third zone forming a strain gauge, essentially perpendicular to the axis of rotation contained in the plane of the layers or mobile masses or to the hinges. Moreover, in all of the embodiments, the gauges are perpendicular to an axis of rotation contained in the plane of the structure and corresponding to the second axis of rotation, or to the zones which connect the mobile part to the fixed part. This is possible due to the use of different thicknesses between the second and third zones, which causes an axis of rotation which is offset in relation to the anchoring of the gauges and allows sensitivity of the device to an out-of-plane movement.

The invention claimed is:

1. A device that detects a rotation around a first axis, the device comprising:

a substrate;

a first zone having a first thickness and including
at least one mass, defining, idle, a plane, arranged at a distance from a second axis of rotation contained in the plane, the mass being able to be caused to vibrate in the plane, perpendicular to the first axis of rotation, and
at least two connecting arms that connect said mass to said second axis of rotation;

means for causing said mass to vibrate in the plane;

a second zone, of second thickness forming, for at least one of the two connecting arms, at least one connection with the substrate for a rotation around said second axis of rotation, the second zone having a thickness smaller than or equal to that of the first zone; and a third zone with a thickness smaller than that of the second zone, including at least one suspended strain gauge that detects rotational movement around said second axis of rotation, the third zone
extends in a plane parallel to the plane of the substrate and does not contain the second axis of rotation,
extends in a plane perpendicular to the second axis of rotation, and
is connected to one of the first and second zones and to the substrate, wherein the mass moves in a direction out of the plane in response to the device rotating around the first axis of rotation.

2. The device according to claim 1, wherein the first zone includes two masses, each mass being arranged, idle, at a distance from a second axis of rotation of the mass, respectively, and a distance between one of the two masses and a corresponding second axis of rotation is equal to a distance between another of the two masses and a corresponding second axis of rotation.

3. The device according to claim 2, wherein the two masses have a second common axis of rotation that is common with the first axis of rotation, and the at least two connecting arms includes four connecting arms, with two arms connecting each of the two masses to said second common axis of rotation.

4. The device according to claim 3, comprising at least two gauges that detect the rotational movement, the two gauges being differential mounted.

5. The device according to claim 2, wherein the two masses have second axes of rotation different from each other, parallel to each other and to the first axis of rotation, the first zone including at least four arms, including two arms to connect each mass to the second axis of rotation, respectively.

6. The device according to claim 5, comprising a coupling device that couples the two masses in anti-phase.

7. The device according to claim 5, comprising at least one gauge that detects the rotational movement of each mass.

8. The device according to claim 1, wherein said at least one strain gauge includes a piezoresistive material, silicon nanowires, monocrystalline or polycrystalline SiGe, or carbon nanotubes.

9. The device according to claim 1, wherein said at least one strain gauge comprises a detection resonator, including at least one vibrating strip, means for exciting the vibrating strip, and a detector that detects vibrations.

10. The device according to claim 9, wherein the excitation of the vibrating strip and/or detection of resonance is accomplished electrostaticaly via at least one electrode arranged, in relation to the vibrating strip, in a direction of vibration.

11. The device according to claim 9, comprising a piezoresistive device that detects a resonance, arranged on the vibrating strip.

12. The device according to claim 1, wherein said at least one strain gauge and the first zone are both situated on a same side in relation to a common plane, lower plane of the first zone in relation to the substrate.

13. The device according to claim 1, wherein the first zone is situated between an upper plane and a lower plane, and the second axis of rotation is in a plane parallel to the upper plane and the lower plane.

14. The device according to claim 13, wherein one or more points of application of strains produced on each of the gauges is in a plane which is parallel to the plane containing the second axis of rotation and perpendicular to each of the upper and lower planes or in planes which are parallel to the plane containing the second axis of rotation and perpendicular to each of the upper and lower planes.

15. The device according to claim 14, including a single gauge per connecting arm, the point of application of strains on this the gauge being in a plane, parallel to the plane containing the second axis of rotation and perpendicular to each of the upper and lower planes, combined with the plane passing through the second axis of rotation, or different from the plane passing through the second axis of rotation.

16. The device according to claim 14, including several gauges per connecting arm, the points of application of the strains on the gauges being in planes parallel to the plane containing the second axis of rotation and perpendicular to each of the upper and lower (N2) planes, different from plane containing the second axis of rotation passing through the second axis of rotation.

17. The device according to claim 1, wherein the thickness of the third zone is smaller than or equal to half of the thickness of the second zone.

18. A device that detects a rotation around a first axis, the device comprising:
a substrate;
a first zone having a first thickness and comprising two masses, defining, idle, a plane, each of said two masses being arranged, idle, at a distance from a second axis of rotation, respectively, and contained in said plane, the two distances between each of these two masses and the respective second axes of rotation being equal, each of said two masses being able to be caused to vibrate in the plane, perpendicular to the first axis of rotation, said two masses having a second common axis of rotation, common with the first axis of rotation, two arms, for each of the two masses, that connect a respective one of the two masses to said second common axis of rotation,
electrostatic combs that cause said masses to vibrate in the plane,
a second zone, of second thickness forming, for at least one of the two arms, at least one connection with the substrate for a rotation around said second axis of rotation, the second zone having a thickness smaller than or equal to that of the first zone;
a third zone with a thickness smaller than that of the second zone, forming at least one suspended strain gauge that detects rotational movement around said second axis of rotation, this third zone
extends in a plane parallel to the plane of the substrate and does not contain the second axis of rotation,
extends in a plane perpendicular to the second axis of rotation,
is connected to one of the first and second zones and, on the other hand, to the substrate,
wherein the two masses move in a direction out of the plane in response to the device rotating around the first axis of rotation.

19. A device that detects a rotation around a first axis, the comprising:
a substrate;
a first zone having a first thickness and comprising two masses, defining, idle, a plane, each of said two masses being arranged, idle, at an equal distance from a respective second axis of rotation contained in said plane, each of said two masses being able to be caused to vibrate in the plane, perpendicular to the first axis of rotation, said two masses having second axes of rotation different from each other, parallel to each other and to the first axis of rotation, the first zone including at least four arms, including two arms to connect each mass to the respective second axis of rotation,
electrostatic combs that cause said masses to vibrate in the plane,
a second zone, of second thickness forming, for at least one of the arms, at least one connection with the substrate for a rotation around said second axis of rotation associated with said at least one of the arms, the second zone having a thickness smaller than or equal to that of the first zone,
a third zone with a thickness smaller than that of the second zone, forming at least one suspended strain gauge that detects the rotational movement around said second axis of rotation associated with said at least one of the arms, this third zone
extends in a plane parallel to the plane of the substrate and does not contain the second axis of rotation associated with said at least one of the arms,
extends in a plane perpendicular to the second axis of rotation associated with said at least one of the arms, and
is connected to one of the first and second zones and to the substrate,
wherein the two masses move in a direction out of the plane in response to the device rotating around the first axis of rotation.

* * * * *